(12) United States Patent
Hu et al.

(10) Patent No.: US 10,152,342 B2
(45) Date of Patent: Dec. 11, 2018

(54) METHOD AND SYSTEM FOR PROVIDING VIRTUAL DESKTOP AND VIRTUAL APPLICATION INTERACTIVITY

(71) Applicant: VMware, Inc., Palo Alto, CA (US)

(72) Inventors: Jinxing Hu, Beijing (CN); Jian Mu, Beijing (CN)

(73) Assignee: VMware, Inc., Palo Alto, CA (US)

( * ) Notice: Subject to any disclaimer, the term of this patent is extended or adjusted under 35 U.S.C. 154(b) by 99 days.

(21) Appl. No.: 14/788,512

(22) Filed: Jun. 30, 2015

(65) Prior Publication Data

US 2017/0003995 A1   Jan. 5, 2017

(51) Int. Cl.
| | |
|---|---|
| *G06F 3/0486* | (2013.01) |
| *G06F 9/445* | (2018.01) |
| *G06F 9/451* | (2018.01) |
| *G06F 9/455* | (2018.01) |
| *G06F 9/44* | (2018.01) |

(52) U.S. Cl.
CPC ........ *G06F 9/45558* (2013.01); *G06F 3/0486* (2013.01); *G06F 9/4445* (2013.01); *G06F 9/452* (2018.02); *G06F 9/45533* (2013.01); *G06F 9/445* (2013.01); *G06F 2009/4557* (2013.01); *G06F 2009/45595* (2013.01)

(58) Field of Classification Search
CPC .............. G06F 9/45558; G06F 3/0486; G06F 2009/4557; G06F 2009/45595; G06F 9/452; G06F 9/4445; G06F 9/45533
See application file for complete search history.

(56) References Cited

U.S. PATENT DOCUMENTS

| | | | | |
|---|---|---|---|---|
| 8,924,564 B2* | 12/2014 | Lublin | .................... | G06F 15/16 709/226 |
| 2003/0189597 A1* | 10/2003 | Anderson | ............. | G06F 3/0481 715/778 |
| 2011/0040812 A1* | 2/2011 | Phillips | ............... | G06F 9/45541 707/822 |
| 2012/0226742 A1* | 9/2012 | Momchilov | .......... | G06F 3/1454 709/203 |
| 2013/0282792 A1* | 10/2013 | Graham | ................ | G06F 9/4445 709/203 |
| 2013/0290858 A1* | 10/2013 | Beveridge | ......... | G06F 17/30899 715/740 |

* cited by examiner

*Primary Examiner* — Emerson C Puente
*Assistant Examiner* — Jonathan R Labud
(74) *Attorney, Agent, or Firm* — Patterson & Sheridan LLP

(57) ABSTRACT

Techniques are disclosed for allowing a virtual application and a virtual desktop to interact. In one embodiment, the virtual application is moved inside the virtual desktop to eliminate the need to switch between user interfaces for the virtual desktop and for the virtual application. In response to a user dragging the user interface of a first virtual desktop interface (VDI) client connected to the virtual application into the user interface of a second VDI client connected to the virtual desktop, information is collected about a first virtual machine (VM) in which the virtual application runs, and the information is transmitted to the second VDI client. The second VDI client passes such information via a virtual channel to a second VM in which the virtual desktop runs, and a remote launcher in the second VM launches a third VDI client that connects to the first VM based on the information.

20 Claims, 4 Drawing Sheets

METHOD AND SYSTEM FOR PROVIDING VIRTUAL DESKTOP AND VIRTUAL APPLICATION INTERACTIVITY

BACKGROUND

In virtual desktop infrastructures (VDIs), virtual desktop operating systems and applications, hosted on virtual machines (VMs) running on centralized servers, are delivered as managed services to end users via a network. Such centralized and automated management of the virtualized operating system, applications, and user data provides increased control and cost savings.

Traditionally, separate instances of virtual desktops and virtual applications do not interact with each other, which can be an inconvenience for users. For example, a user may often need to switch between the VDI client windows for a virtual desktop and a virtual application. Such switching may be particularly inconvenient when the virtual desktop is in full-screen mode and the VDI client needs to be restored to its previous window size before the user can switch to the other VDI client window for the virtual application. Another inconvenience is the inability to perform certain operations such as copy-and-paste and drag-and-drop operations between a virtual desktop and a virtual application, which requires copying or dragging contents out of one of the virtual environments into the local environment and may thus be forbidden for security reasons.

SUMMARY

One embodiment provides a computer-implemented method of moving a virtual application into a virtual desktop so that the virtual application and desktop can interact. The method generally includes transmitting, from a first virtualized desktop infrastructure (VDI) client connected to the virtual application to a second VDI client connected to the virtual desktop, information indicating a first virtual computing instance in which the virtual application runs. The method further includes transmitting, from the second VDI client to a second virtual computing instance in which the virtual desktop runs, the information indicating the first virtual computing instance. In addition, the method includes launching, in the second virtual computing instance, a third VDI client which connects to the first virtual computing instance based on the information transmitted to the second virtual computing instance.

Further embodiments of the present invention include a non-transitory computer-readable storage medium storing instructions that when executed by a computer system cause the computer system to perform the method set forth above, and a computer system programmed to carry out the method set forth above.

DETAILED DESCRIPTION

This disclosure presents techniques allowing a virtual application and a virtual desktop to interact. In one embodiment, the virtual application is moved inside of the virtual desktop to eliminate the need to switch between the user interface (e.g., the window) for the virtual desktop and the user interface for the virtual application. In response to a user dragging the user interface of a first virtual desktop interface (VDI) client connected to the virtual application into the user interface of a second VDI client connected to the virtual desktop, drag-and-drop modules collect information about a first virtual machine (VM) in which the virtual application runs, and the information is transmitted to the second VDI client. In turn, the second VDI client passes the information via a virtual channel to a second VM in which the virtual desktop runs. Upon receiving the information at the second VM, a remote launcher is started therein and launches a third VDI client in the second VM (also referred to herein as the "nested" VDI client) that connects to the first VM indicated by the collected and transmitted information. Thereafter, the user may access the virtual application via the third VDI client as if the virtual application were an application running inside the virtual desktop, without having to switch user interfaces between the virtual application and the virtual desktop or the local system. Although virtual machines are used herein as an example of virtual computing instances, other virtual computing instances such as operating system (OS)-less containers, or physical computing systems, may be employed in other embodiments.

Reference will now be made in detail to several embodiments, examples of which are illustrated in the accompanying figures. It is noted that wherever practicable similar or like reference numbers may be used in the figures and may indicate similar or like functionality. The figures depict embodiments for purposes of illustration only. One skilled in the art will readily recognize from the following description that alternative embodiments of the structures and method illustrated herein may be employed without departing from the principles described herein.

Figure 1:
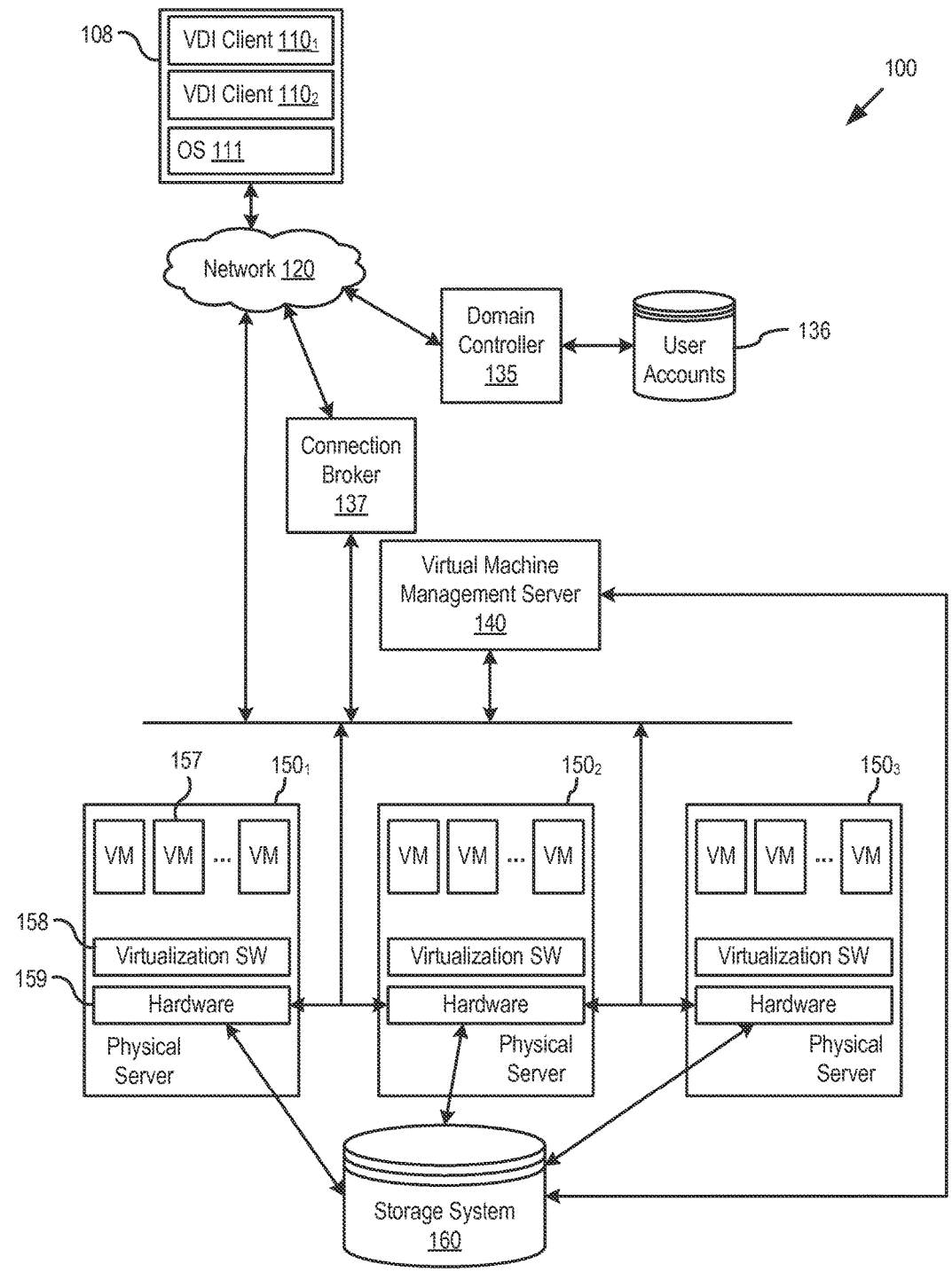
FIG. 1 illustrates components of a virtualized desktop infrastructure (VDI) system in which one or more embodiments of the present invention may be implemented.

FIG. 1 illustrates components of a virtualized desktop infrastructure (VDI) system 100 in which one or more embodiments of the present invention may be implemented. In VDI system 100, VDI client software programs (also referred to as "VDI clients" for short), e.g., VDI clients 110$_{1-2}$, run on operating systems of local computing devices, e.g., client machine 108 on top of an operating system (OS) 111. VDI clients provides an interface for the users to access their desktops, which may be running in one of virtual machines 157 or a blade server (not shown) in a data center that is remote from the user location. With VDI clients, users can access desktops running in a remote data center through network 120, from any location, using a general purpose computer running a commodity operating system and a VDI client software program such as VMware® View™, or a special purpose thin client such as those available from Dell, HP, NEC, Sun Microsystems, Wyse, and others.

VDI system 100 includes a domain controller 135, such as Microsoft® Active Directory®, that manages user accounts 136 including user log-in information, and a connection broker 137 that manages connections between VDI clients and desktops running in virtual machines 157 or other platforms. Domain controller 135 and connection broker 137 may run on separate servers or in separate virtual machines running on the same server or different servers. In the embodiments of the present invention illustrated herein, desktops are running in VMs 157 which are instantiated on a plurality of physical computers 150, 152, 154, each of which includes virtualization software 158 and hardware 159 (CPU(s), memory, storage, etc.), is controlled by a virtual machine management server 140, and is coupled to a shared persistent storage system 160. Each of VMs 157 may further run a remote agent (not shown) that is responsible for sending display information of a virtual desktop or application to VDI clients 110$_{1-2}$ and receiving certain inputs from VDI clients 110$_{1-2}$.

In one embodiment, a virtual application running in one VM is moved into a virtual desktop running in another VM. In response to a user dragging the user interface of a first VDI client (e.g., VDI client 110$_1$) connected to the virtual application into the user interface of a second VDI client (e.g., VDI client 110$_2$) connected to the virtual desktop, information on the VM in which the virtual application runs is collected and transmitted to the second VDI client. The second VDI client then passes the information via a virtual channel to the VM in which the virtual desktop runs, and a remote launcher in the VM launches another VDI client therein that connects to the VM in which the virtual application runs, as indicated by the collected and transmitted information. The user may then access the virtual application via the new VDI client as if the virtual application were running inside the virtual desktop, without having to switch user interfaces between the virtual application and the virtual desktop or the local system.

Figure 2:
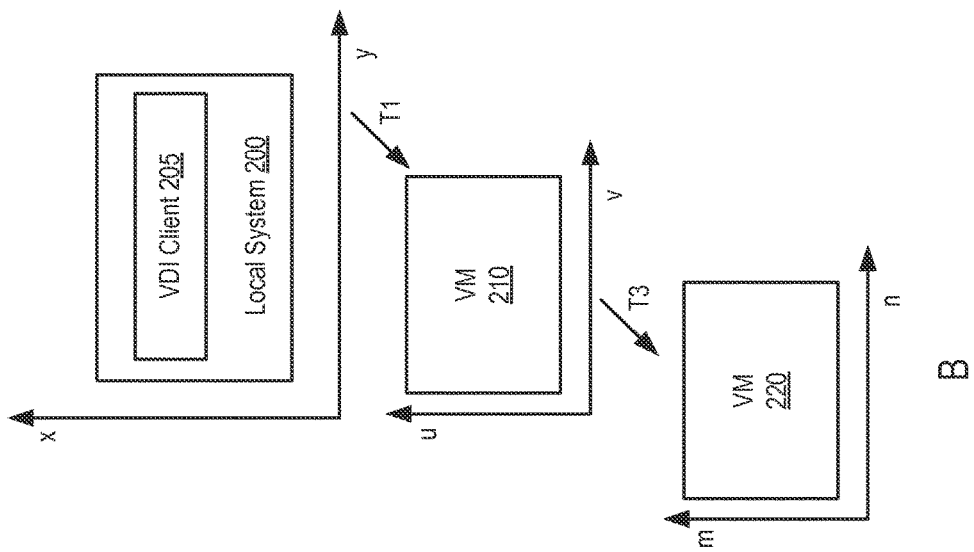
FIG. 2 illustrates coordinate transformations needed to interact with multiple virtual environments, according to traditional practices and to an embodiment.
Figure 2:
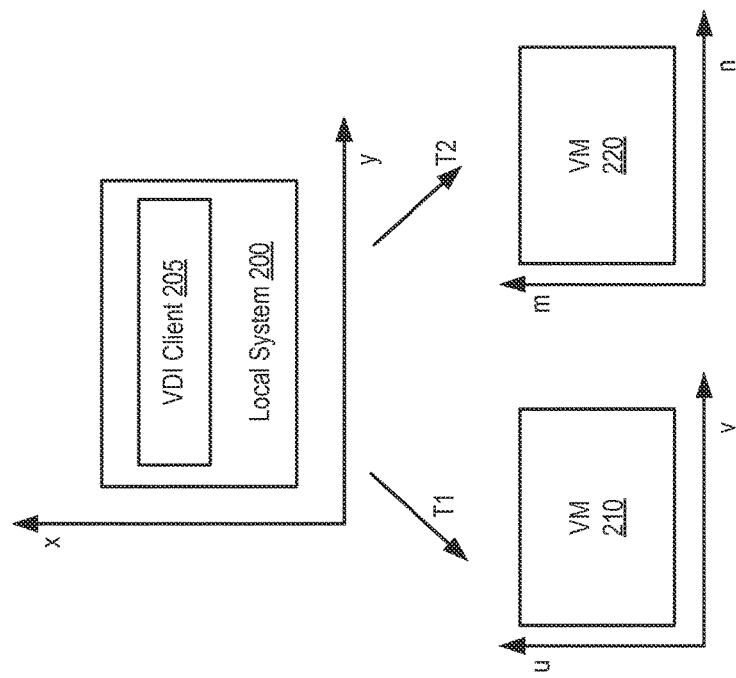

FIG. 2 illustrates coordinate transformations needed to interact with multiple virtual environments, according to traditional practices and to an embodiment. As shown in panel A, traditionally two coordinate transformations T1 and T2 are required to switch from a local operating system 205 to virtual environments (e.g., virtual desktops and/or applications) provided by VMs 210-220, respectively. As used herein, a coordinate transformation refers to a switch between user interfaces, from that of a local operating system to that of a VDI client connected to a VM (and vice versa) or from that of one VDI client connected to a VM to another VDI client connected to a different VM. Let local system 105 have coordinate (X, Y) and VMs 210-220 have coordinates (U, V) and (M, N), respectively. Then the following transformations are needed to switch from local system 205 to virtual environments provided by VM 210 and VM 220, respectively, according to the traditional approach depicted in panel A:

$$T1(x,y)=\{u(x,y),v(x,y)\}$$

$$T2(x,y)=\{m(x,y),n(x,y)\}$$

At the same time, VM 210 and VM 220 cannot directly interact with each other, so a transformation back to local system 205 is required to accomplish even simple tasks. For example, copying text from a document open in VM 210 to another document open in VM 220 requires reading from the first document in VM 210, switching back to local system 205, switching from local system 205 to the user interface of a VDI client connected to VM 220, and then writing to the other document in VM 220. As another example, when copying data out of a VM to a local system is forbidden for security reasons (e.g., because the data is copied outside a security zone), the same operation to copy text from a document open in VM 210 to another document open in VM 220 may require the even more inconvenient steps of copying the text to an e-mail first, sending the e-mail, switching back to local system 205, switching from local system 205 to the user interface of a VDI client connected to VM 220, opening the e-mail in VM 220, and copying-and-pasting the text in the e-mail to the other document.

Panel B shows the coordinate transformations according to an embodiment, after the virtual environment provided by VM 220 is moved into the virtual environment provided by VM 210. An approach for moving a virtual application into a virtual desktop is discussed in greater detail below. After such a move, interactions between the two VMs 210-220 can be achieved via a single coordinate transformation T3:

$$T3(u,v)=\{m(u,v),n(u,v)\}$$

For example, text from a document open in VM 210 may be copied to another document open in VM 220 by reading from the first document in VM 210, switching to the user interface of a VDI client running in VM 210 and connected to VM 220, and then writing to the other document in VM 220. Additionally, no data is copied out of VM 210 into local system 205, so a security policy that forbids such copying of data out of VM 210 will not affect the copying of data to the other document in VM 220.

Figure 3:
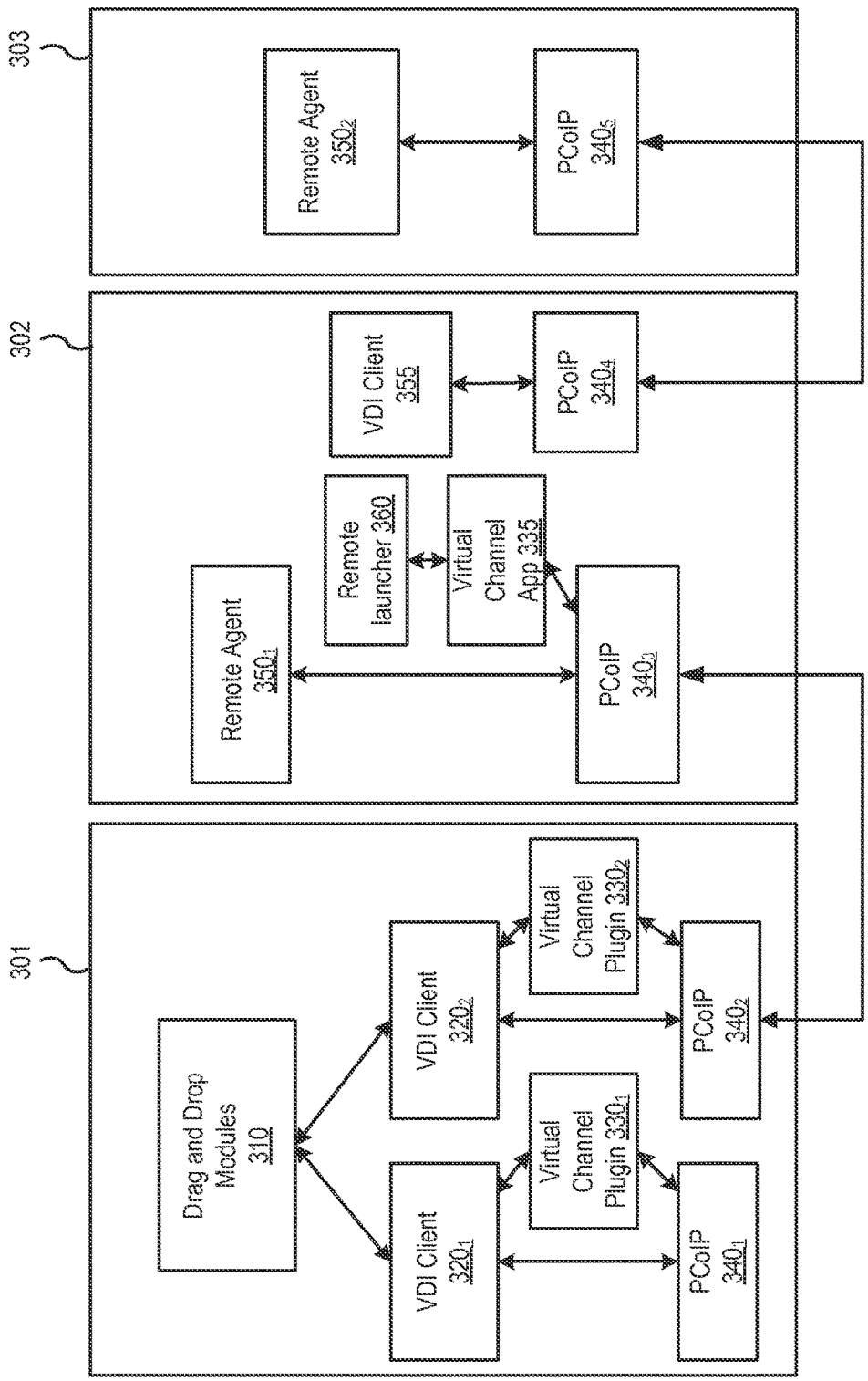
FIG. 3 illustrates an approach for initiating a nested VDI client in a virtual machine, according to an embodiment.

FIG. 3 illustrates an approach for initiating a nested VDI client in a virtual machine, according to an embodiment. As shown, VMs 302-303 include remote agents 350$_{1-2}$, respectively, that are processes responsible for sending display information of a virtual desktop or application to VDI clients and receiving certain inputs from the VDI clients. Remote launcher 360, virtual channel application 335, and PCoIP (servers) 340$_{3-5}$ are other processes running in virtual machines 302-303 and described in greater detail below.

Drag-and-drop modules 310 running in a client device 301 permit a virtual application to be moved into a virtual desktop responsive to a user dragging the user interface (e.g., a window) of a VDI client 320$_1$ connected to the virtual application into the user interface of a VDI client 320$_2$ connected to the virtual desktop. The implementation of drag-and-drop modules 310 may differ for different operating systems. For example, to implement drag-and-drop modules 310 in the Windows® OS, a drag component object model (COM) interface and a drop COM interface may be integrated in VDI clients 320$_{1-2}$. When a user drags the window of a VDI client 320$_1$ connected to the virtual application in such a case, VDI client 320$_1$ collects and bundles information for the VM in which the virtual application is running. The information that VDI client 320$_1$ collects and bundles may include a name or identifier of the VM (e.g., VM 302 or 303), such as a universal name of the VM, and potentially other types of information such as connection broker information, session information, and user information needed to connect to the VM in which the virtual application runs. When the window of VDI client 320$_1$ connected to the virtual application is dropped in the window of VDI client 320$_2$ connected to the virtual desktop, VDI client 320$_2$ checks whether the drag source includes a "transfer" message type. If the drag source includes the "transfer" message type, then VDI client 320$_2$, which is the drop target, retrieves the information that was collected from the source data bundle. VDI client 320$_2$ further passes such information via virtual channel 330$_2$ to VM 303.

Virtual channels 340$_{1-2}$ are logical communication channels between client device 301 and VMs 302-303. Examples of virtual channel technology include PC over IP (PCoIP) virtual channels and VMware® virtual channels. PCoIP virtual channels in particular are extensions or plugins for the PCoIP protocol that allow VDI clients and remote agents to define and implement their own logical protocol to exchange data, utilizing PCoIP as the transportation protocol. Each of the virtual channels serves as a multiplex over the PCoIP data transfer channel. Further, PCoIP virtual channels inherit NAT (Network Address Translation) penetration from the PCoIP protocol, allowing VDI clients $320_{1-2}$ to communicate with VMs 302-303 even when they are in different security zones. Illustratively, each PCoIP virtual channel includes two endpoints, one of which is a plugin (e.g., VChannel plugins $330_{1-2}$) on the client device 301 side and the other of which is an application or service (e.g., VChannel application 335) on the VM 302 or 303 side. After one of VDI clients $320_{1-2}$ connects to VM 302, a PCoIP client (library) running in the client device 301 loads the appropriate VChannel plugins and performs a handshake negotiation with PCoIP server $340_3$ running in VM 302 to start VChannel application 335. If the handshake is successful, Vchannel application 335 is started and a virtual channel over PCoIP between Vchannel plugin $330_1$ or $330_2$ will be set up. As discussed, VDI clients $320_{1-2}$ may then pass the information via the virtual channels to VM 302. For security purposes, the information may be encrypted for transfer in one embodiment.

After information is passed to VM 302 via the virtual channel, Vchannel application 335, which receives such information, starts a remote launcher 360 process. Remote launcher 360 is an application loader that is responsible for starting a new VDI client 355 (also referred to herein as the "nested" VDI client) in VM 302 and connecting nested VDI client 355 to the VM 303 in which the virtual application runs, as identified by the received information. In one embodiment, remote launcher 360 may configure nested VDI client 355 to use the same credentials used to authenticate the user to the virtual desktop running in VM 302 to authenticate the connection to VM 303. In such a case, no further user authentication is required to connect to the virtual application. Of course, the same credentials need not be reused, and new user credentials may be transmitted (e.g., via the virtual channel) to authenticate the connection to VM 303.

Once nested VDI client 355 connects to VM 303 in which the virtual application runs, the virtual application will appear as a native program inside the virtual desktop. As a result, the user does not need to switch between VDI client user interfaces or switch back to the local system to perform tasks such as copying-and-pasting text from the virtual application to the virtual desktop, or vice versa. Additionally, no data is copied out of the VM when such a copying-and-pasting operation is performed, so a security policy that forbids such copying of data out of the VM (e.g., because the data is copied outside a security zone) will not affect the operation.

Figure 4:
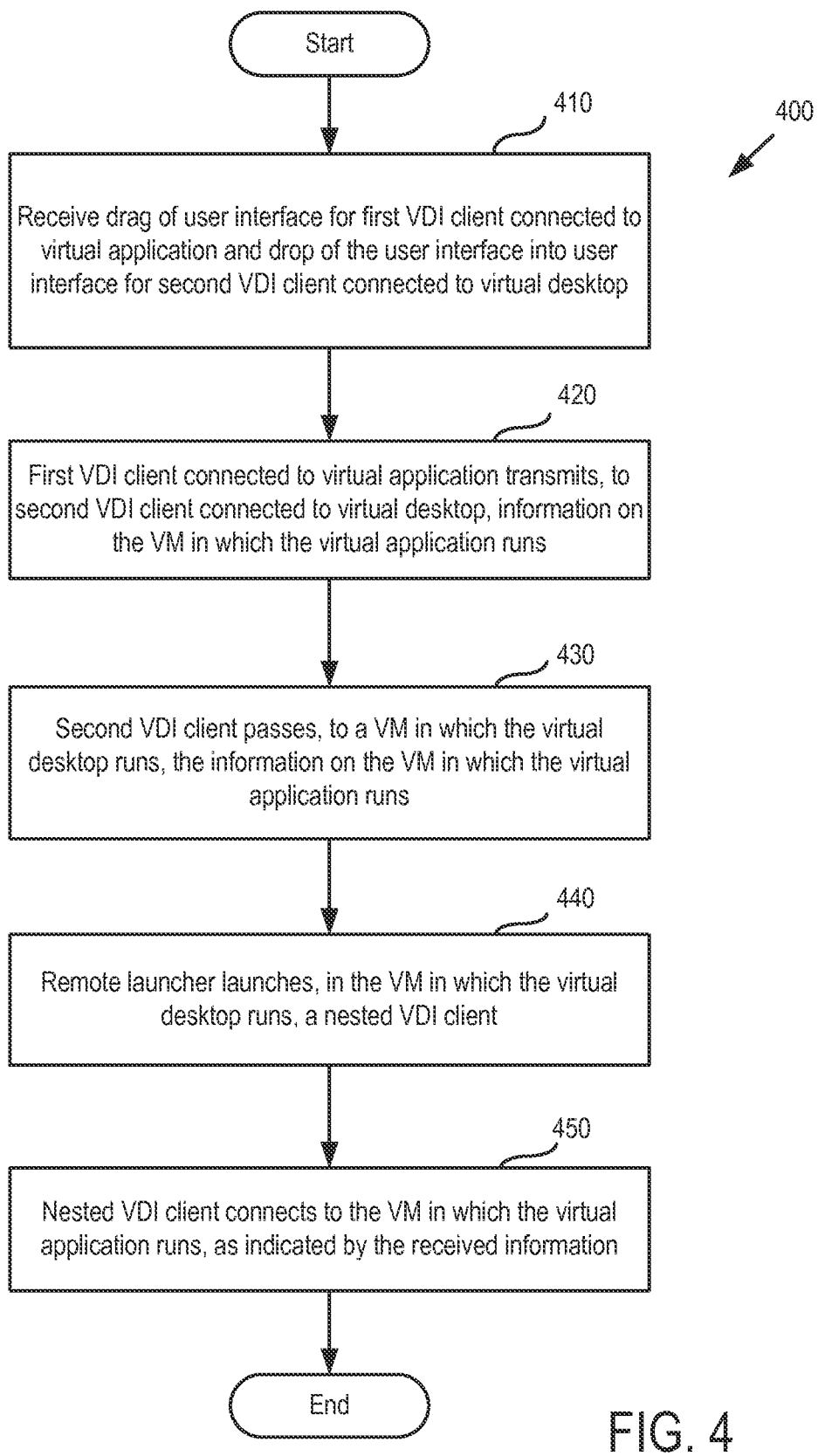
FIG. 4 illustrates a method for moving a virtual application into a virtual desktop, according to an embodiment.

FIG. 4 illustrates a method 400 for moving a virtual application into a virtual desktop, according to an embodiment. As shown, the method 400 begins at step 410, where a drag of the user interface for a first VDI client connected to a virtual application and drop of that user interface into a user interface for a second VDI client connected to a virtual desktop is received. As discussed, various drag-and-drop mechanisms may be implemented, depending on the operating system. For example, drag-and-drop modules may be implemented in the Windows® OS, with a drag component object model (COM) interface and a drop COM interface be integrated into VDI clients, as discussed above with respect to FIG. 3. Although discussed herein primarily with respect to drag-and-drop, it should be understood that any feasible mechanism (e.g., a selection menu) may be used to indicate that a virtual application is to be moved into a virtual desktop.

At step 420, the first VDI client connected to a virtual application transmits, to a second VDI client connected to a virtual desktop, information on the VM in which the virtual application runs. In response to the drag-and-drop operation of step 410, the first VDI client may collect and bundle information on the VM in which the virtual application runs and to which the first VDI client is connected. As discussed, such information may include a name or identifier of the VM in which the virtual application runs, such as a universal name, and potentially other types of information such as connection broker information, session information, and user information needed to connect to the VM in which the virtual application runs. The information that is collected and bundled is then transmitted to the second VDI client.

At step 430, the second VDI client passes, to the VM in which the virtual desktop runs, the information on the VM in which the virtual application runs. In one embodiment, the information may be passed to the VM via a virtual channel, and the information may be encrypted for transfer. As discussed, a virtual channel, such as a PCoIP virtual channel, may include extensions or plugins that allow VDI clients and remote agents to define and implement their own logical protocol to exchange data. For example, a PCoIP virtual channel implements such a logical protocol while using PCoIP as the transportation protocol. Each virtual channel includes two endpoints, one of which may be a plugin on the client device side and the other of which may be an application or service on the server side.

At step 440, a remote launcher launches, in the VM in which the virtual desktop runs, a nested VDI client. As discussed, the remote launcher itself may be started by the virtual channel application or service on the server side in response to receiving the message that contains the information on the VM in which the virtual application runs. The remote launcher then starts the nested VDI client using the received information.

At step 450, the nested VDI client connects to the VM in which the virtual application runs, as indicated by the received information. In one embodiment, the remote launcher may configure the nested VDI client to use the same credentials used to authenticate the user to the virtual desktop, in which the nested VDI client runs, to authenticate the connection to the VM in which the virtual application runs. No further user authentication is then required to connect to the virtual application.

Although discussed above primarily with respect to moving a virtual application into a virtual desktop, it should be understood that techniques disclosed herein may also be applied to move one virtual desktop into another virtual desktop in one embodiment. In another embodiment, a virtual application (or virtual desktop) which has been moved into a virtual desktop may also be moved back out in response to the user dragging the VDI client window for the virtual application (or desktop) out of the VDI client window for the virtual desktop. Further, although PCoIP is used an example herein, it should be understood other remote display protocols (e.g., the BLAST protocol) may be used in lieu of PCoIP in some embodiments.

Advantageously, techniques disclosed herein permit a virtual application (or desktop) to be moved into a virtual desktop so that the virtual application appears to the user as a native application in the virtual desktop. As a result, a user can work with both the virtual application and the virtual desktop without switching between multiple VDI client user interfaces or the local system. That is, the user can immerse him or herself in the virtual desktop, without switching between user interfaces. In addition, data can be copied between the virtual application and the virtual desktop without copying the data to the local system, which is forbidden by some security policies.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs), CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Certain embodiments as described above involve a hardware abstraction layer on top of a host computer. The hardware abstraction layer allows multiple contexts or virtual computing instances to share the hardware resource. In one embodiment, these virtual computing instances are isolated from each other, each having at least a user application running therein. The hardware abstraction layer thus provides benefits of resource isolation and allocation among the virtual computing instances. In the foregoing embodiments, virtual machines are used as an example for the virtual computing instances and hypervisors as an example for the hardware abstraction layer. As described above, each virtual machine includes a guest operating system in which at least one application runs. It should be noted that these embodiments may also apply to other examples of virtual computing instances, such as containers not including a guest operation system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Many variations, modifications, additions, and improvements are possible. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A method of moving a virtual application into a virtual desktop, comprising:

providing, from a first virtualized desktop infrastructure (VDI) client that is running on a client device and has access to the virtual application running on a first virtual computing instance to a second VDI client that is running on the client device and has access to the virtual desktop running on a second virtual computing instance, information for connecting to the first virtual computing instance;

transmitting, from the second VDI client to the second virtual computing instance, the information for connecting to the first virtual computing instance; and launching, within the second virtual computing instance, a third VDI client which connects to the first virtual computing instance based on the information transmitted to the second virtual computing instance, wherein upon said launching, the virtual application is accessed from the client device through the virtual desktop.

2. The method of claim 1, wherein the information for connecting to the first virtual computing instance includes at least one of a name, an identifier (ID), or a session.

3. The method of claim 1, wherein the information for connecting to the first virtual computing instance is provided to the second VDI client in response to a drag-and-drop operation in which a window of the first VDI client is dragged into a window of the second VDI client.

4. The method of claim 1, wherein the third VDI client connects to the first virtual computing instance using the same authentication credentials used to connect the second VDI client to the virtual desktop.

5. The method of claim 1, wherein the virtual computing instance is a virtual machine.

6. The method of claim 1, wherein the provided information further includes connection broker information and user information.

7. The method of claim 1, wherein the information for connecting the first virtual computing instance is transmitted from the second VDI client to the second virtual computing instance via a virtual channel which utilizes a remote display protocol as a transportation protocol.

8. The method of claim 1, further comprising, connecting the first VDI client to the virtual application in response to a drag-and-drop operation in which a window of the third VDI client is dragged out of a window of the second VDI client.

9. A non-transitory computer-readable storage medium containing a program which, when executed by one or more processors, performs operations for moving a virtual application into a virtual desktop, the operations comprising:

providing, from a first virtualized desktop infrastructure (VDI) client that is running on a client device and has access to the virtual application running on a first virtual computing instance to a second VDI client that is running on the client device and has access to the virtual desktop running on a second virtual computing instance, information for connecting to the first virtual computing instance;

transmitting, from the second VDI client to the second virtual computing instance, the information for connecting to the first virtual computing instance; and causing the second virtual computing instance to launch, within the second virtual computing instance, a third VDI client which connects to the first virtual computing instance based on the information transmitted to the second virtual computing instance, wherein upon said launching of the third VDI client, the virtual application is accessed from the client device through the virtual desktop.

10. The computer-readable storage medium of claim 9, wherein the information for connecting to the first virtual computing instance includes at least one of a name, an identifier (ID), or a session.

11. The computer-readable storage medium of claim 9, wherein the information for connecting to the first virtual computing instance is provided to the second VDI client in response to a drag-and-drop operation in which a window of the first VDI client is dragged into a window of the second VDI client.

12. The computer-readable storage medium of claim 9, wherein the third VDI client connects to the first virtual computing instance using the same authentication credentials used to connect the second VDI client to the virtual desktop.

13. The computer-readable storage medium of claim 9, wherein the virtual computing instance is a virtual machine.

14. The computer-readable storage medium of claim 9, wherein the provided information further includes connection broker information and user information.

15. The computer-readable storage medium of claim 9, wherein the information for connecting to the first virtual computing instance is transmitted from the second VDI client to the second virtual computing instance via a virtual channel which utilizes a remote display protocol as a transportation protocol.

16. The computer-readable storage medium of claim 9, the operations further comprising, connecting the first VDI client to the virtual application in response to a drag-and-drop operation in which a window of the third VDI client is dragged out of a window of the second VDI client.

17. A system comprising:

a processor; and a memory, wherein the memory includes a program configured to perform operations for moving a virtual application into a virtual desktop, the operations comprising:

providing, from a first virtualized desktop infrastructure (VDI) client that is running on the system and has access to the virtual application running on a first virtual computing instance to a second VDI client that is running on the system and has access to the virtual desktop running on a second virtual computing instance, information for connecting to the first virtual computing instance;

transmitting, from the second VDI client to the second virtual computing instance, the information for connecting to the first virtual computing instance; and causing the second virtual computing instance to launch, within the second virtual computing instance, a third VDI client which connects to the first virtual computing instance based on the information transmitted to the second virtual computing instance, wherein upon said launching of the third VDI client, the virtual application is accessed from the system through the virtual desktop.

18. The system of claim 17, wherein the information for connecting to the first virtual computing instance includes at least one of a name, an identifier (ID), or a session.

19. The system of claim 17, wherein the information for connecting to the first virtual computing instance is provided to the second VDI client in response to a drag-and-drop operation in which a window of the first VDI client is dragged into a window of the second VDI client.

20. The system of claim 17, wherein the third VDI client connects to the first virtual computing instance using the same authentication credentials used to connect the second VDI client to the virtual desktop.

* * * * *